United States Patent [19]

Rice et al.

[11] Patent Number: 4,838,138
[45] Date of Patent: Jun. 13, 1989

[54] SCROLL SAW BLADE HOLDER AND BLADE ALIGNING DEVICE

[75] Inventors: Verle Rice, Harrisonville; William Curtis, Pleasant Hill; Richard Keener, Garden City; Robert Raffurty, Pleasant Hill, all of Mo.

[73] Assignee: R. B. Industries, Inc., Harrisonville, Mo.

[21] Appl. No.: 37,544

[22] Filed: Apr. 13, 1987

[51] Int. Cl.⁴ .............................................. B27B 19/06
[52] U.S. Cl. .................................. 83/698; 83/783; 83/781; 83/782; 83/662; 30/392; 29/271
[58] Field of Search ................ 83/783, 782, 781, 784, 83/786, 662, 698, 699, 697; 30/392, 393, 394; 29/271

[56] References Cited

U.S. PATENT DOCUMENTS

| | | | |
|---|---|---|---|
| 536,980 | 4/1895 | Wilson | 83/781 |
| 684,756 | 10/1901 | Hapgood | 83/777 |
| 3,795,980 | 3/1974 | Batson | 83/747 |
| 4,503,742 | 3/1985 | Sutton | 83/783 |
| 4,616,541 | 10/1984 | Eccardt et al. | 83/782 |
| 4,646,605 | 3/1987 | Rice et al. | 83/783 |
| 4,670,986 | 6/1987 | Chen | 83/698 X |

Primary Examiner—Donald R. Schran
Attorney, Agent, or Firm—Kokjer, Kircher, Bradley, Wharton, Bowman & Johnson

[57] ABSTRACT

A scroll saw blade clamp and blade alignment tool to facilitate blade changes while assuring proper positioning and alignment of the blade. The blade clamp is for the upper end of the blade and includes a pair of clamp bars, one of which is pivoted to the upper saw arm. A locking screw clamps the bars together for clamping of the blade, and a strategically located pin prevents relative rotation of the clamp bars and also serves as a blade guide to properly locate the blade while it is being clamped in place. The alignment device takes the form of a flat bar provided with a recess for holding the lower blade clamp. A groove in the bar is centered on the recess to properly align a saw blade received in the groove.

2 Claims, 2 Drawing Sheets

SCROLL SAW BLADE HOLDER AND BLADE ALIGNING DEVICE

BACKGROUND AND SUMMARY OF THE INVENTION

This invention relates in general to scroll saws and more particularly to improvements in the mounting of scroll saw blades.

Power scroll saws have enjoyed considerable recent popularity, due in large part to their ability to make the extremely accurate cuts required for finely detailed fret work and other intricate patterns. Modern scroll saws are either parallel arm saws or one piece C arm saws. The parallel arm saw includes separate upper and lower arms which pivot in tandem about vertically aligned pivot pins. The C arm saw is similar except that the two arms are part of a single C shaped arm structure which pivots about a pivot point located on the bight portion of the C arm.

The ability of scroll saws to achieve intricate cutting is due primarily to the extremely thin blades that are used and the resulting ability of the blades to cut sharp turns. However, the thin blades are susceptible to breaking, and it is essential for the blade to be kept under the proper uniform tension in order to prevent excessive blade tension or undue blade flexing, either of which can result in poor cutting action and early blade failure. In parallel arm saws, the blade tension is normally adjusted by tightening a tensioning rod which extends between the back ends of the two arms. An adjustment lever or knob on the front end of the upper arm is used for adjusting the blade tension in C arm saws. In both cases, the blade must be able to pivot relative to the arm, and the chucks or blade holders are thus pivotally mounted on the arms.

During operation of a scroll saw, the need to perform piercing or interior cuts is often encountered. This requires that the blade be removed and threaded through an opening in the wood before being attached again to the saw arms. The reverse procedure is required after each inside cut has been completed. Because of the need to frequently remove and reattach the saw blade, it is highly desirable for the blade to be mounted in a manner permitting it to be quickly and easily attached and detached. It is also important for the blade tension to be maintained constant before and after each blade change. The blade clamps that are ordinarily used are either tapered or round blocks that rock in grooved seats on the arms or clamp blocks that are pivotally pinned to the saw arms.

One type of blade holding system that has proven to be particularly effective in a parallel arm scroll saw includes a round or tapered blade clamp that seats in a groove in the lower arm in combination with a pair of upper clamp blocks which are pinned to the end of the upper arm. Blade removal is carried out by releasing the tension adjustment mechanism at the back ends of the arms, loosening the screw which clamps the blade between the upper clamp blocks, releasing the top end of the blade and threading it through an inside cut, and clamping the blade in the upper chuck again by retightening the screw.

The clamp elements in the upper chuck are a pair of flat metal blocks, one of which is pivotally pinned to the end of the upper arm. The blocks may be tightened to clamp the blade between them by tightening a machine screw. A roll pin extends through aligned apertures in the blocks to keep them from turning relative to one another about the screw axis.

Although this system functions well for the most part, it is necessary but not always easy to make certain that the top end of the blade is exactly centered in the upper blade clamp. If the blade is off center when clamped between the clamp blocks, the saw will not cut properly and the blade is subjected to excessive forces which can break it. Similarly, when a broken or damaged blade is replaced by a new blade, the blade must be centered in the lower chuck in order for the saw to operate properly.

The present invention is directed to an improved blade clamp for the top end of a scroll saw blade and also to a uniquely constructed tool which automatically centers the blade in the lower blade clamp.

The upper blade clamp is provided with a guide pin which is strategically located in order to properly and repeatably center the blade in the upper blade clamp. By virtue of its strategic location, the pin serves the dual purposes of connecting the two clamp blocks and also guiding the blade into the proper position so that it is precisely centered in the blade clamp when the lock screw is tightened.

The tool which is used to properly align the blade in the lower blade clamp takes the form of a flat bar provided with a recess and an intersecting groove. The recess has a configuration to closely receive the lower blade clamp. The groove in the tool intersects with the recess at a location to assure that when a blade is inserted into the groove and butted at its end against the lock screw of the blade clamp, the blade will be properly aligned and centered in the clamp.

By providing for the proper location and alignment of the blade in both blade clamps, the present invention facilitates blade changes and at the same time assures proper cutting action because the blade is maintained at the proper position and under proper tension at all times. The overall result is that the saw can be operated easily and accurately even by inexperienced operators, while the time and difficulty involved in removing and replacing blades is reduced substantially in comparison to other scroll saws.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
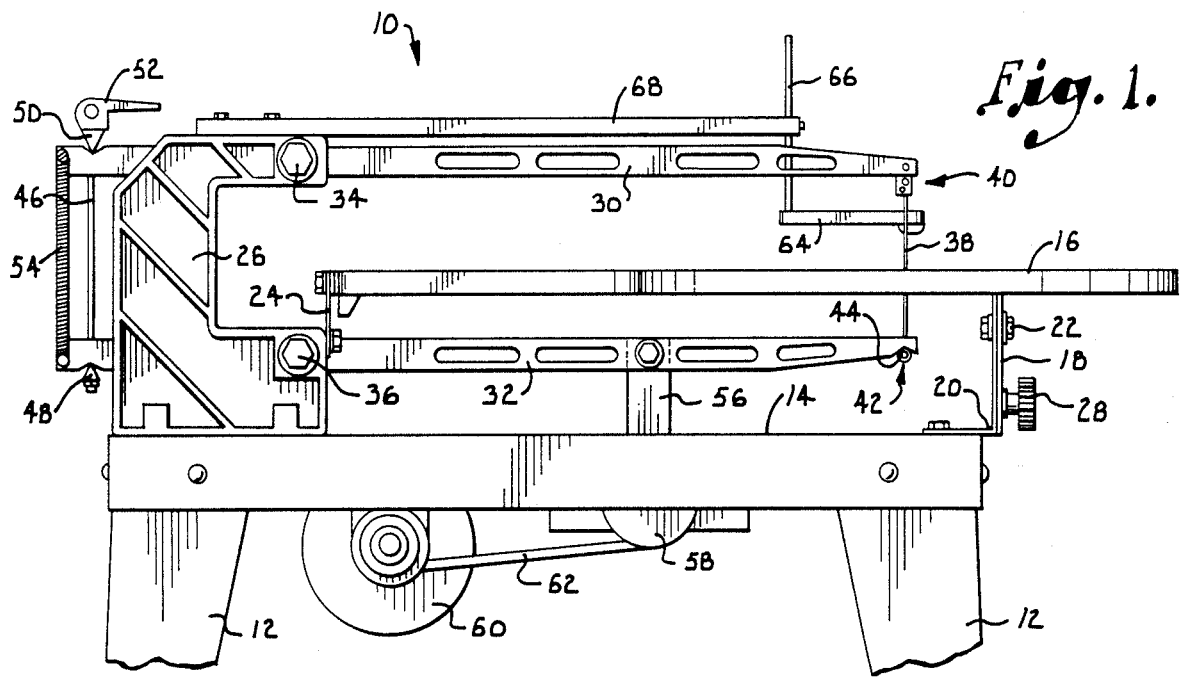
FIG. 1 is a fragmentary side elevational view of a scroll saw of the type which may incorporate the blade holder and the alignment device of the present invention.

Referring now to the drawings in more detail and initially to FIG. 1, numeral 10 generally designates a parallel arm scroll saw which is constructed in a conventional manner for the most part. The framework of the saw includes legs 12 which support a horizontal flanged panel 14. A table 16 provides a working surface for receiving and supporting workpieces that are cut by the saw. A thin plate 18 extends downwardly from table 16 and is connected with an L-shaped bracket 20 by a bolt 22. At its back end, table 16 has a downwardly projecting plate 24 which connects with a pair of C-shaped brackets 26 mounted on panel 14. Table 16 may be tilted about a horizontal axis and can be locked in place by tightening a knob 28 to lock blade 18 and bracket 22 to one another.

Upper and lower saw arms 30 and 32 extend forwardly from the respective upper and lower arms of the C-shaped brackets 26. Arms 30 and 32 are parallel and pivot at their back ends about horizontal bolts 34 and 36 which are vertically aligned with another. A thin scroll saw blade 38 extends between the front ends of arms 30 and 32. The top end of blade 38 is held by an upper chuck or blade clamp 40 which will subsequently be described in more detail. The bottom end of blade 38 is held by a lower chuck or blade clamp 42 which will likewise be described in more detail. The lower blade clamp 42 is seated in a V-shaped groove 44 formed in the bottom of the lower arm 32 at its front end. The lower blade clamp is generally cylindrical and is able to rock in the groove 44 as arms 30 and 32 are reciprocated up and down during operation of the saw.

The tension of blade 38 is controlled by a tension adjusting mechanism which includes a tensioning rod 46 extending between the back ends of arms 30 and 32. The opposite ends of rod 46 are received by wedge shaped blocks 48 and 50 which act in grooves formed in the upper and lower arms, respectively. A cam 52 acts against the upper block 50 in a manner to adjust the blade tension as the cam is turned. A tension spring 54 is connected between the back ends of arms 30 and 32.

The details of the tension adjusting mechanism and other parts of the saw thus far described are set forth more fully in pending application Ser. No. 860,042 filed by Verle Rice on May 6, 1986 and entitled "Quick Release Mechanism for Changing Saw Blades", which is incorporated herein by reference.

The saw arms 30 and 32 are driven up and down in tandem by a drive arm 56 which is eccentrically pinned to a pulley assembly 58. An electric motor 60 drives the pulley assembly 58 through a drive belt 62, thus causing arms 30 and 32 to reciprocate up and down about bolts 34 and 36. Reciprocation of the arms in turn imparts sawing action to the blade 38. A guide 64 for the workpieces on table 16 is carried on a vertical rod which is in turn attached to an arm 68 extending from the C-shaped brackets 26.

Figure 2:
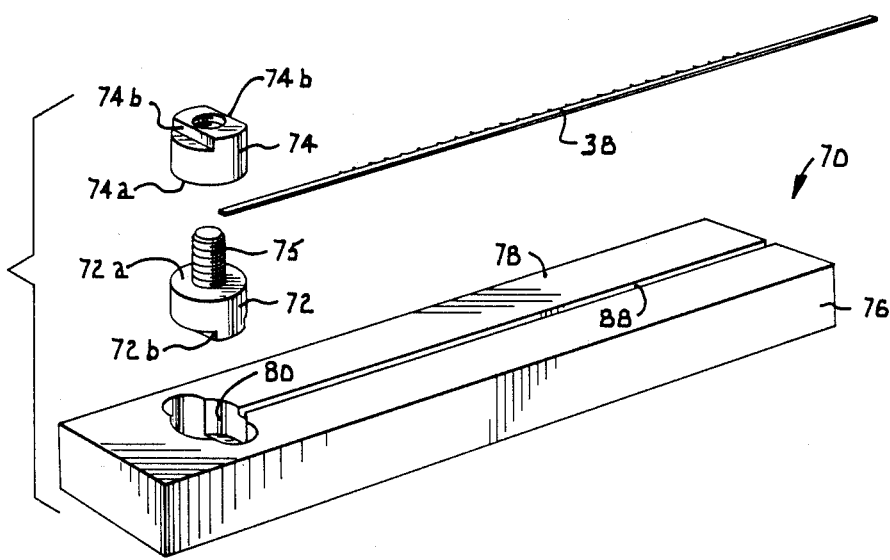
FIG. 2 is an exploded perspective view on an enlarged scale showing the scroll saw blade and lower blade clamp along with an alignment tool constructed according to one embodiment of the invention.
Figure 3:
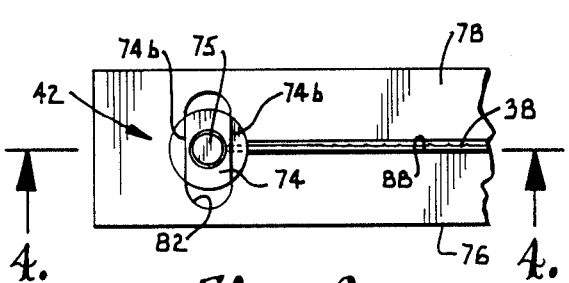
FIG. 3 is a fragmentary top plan view showing the blade and blade clamp applied to the tool shown in FIG. 2.
Figure 4:
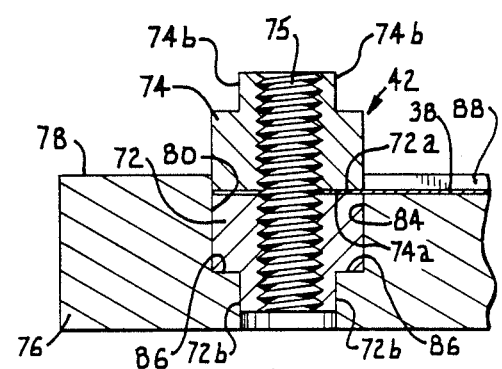
FIG. 4 is a fragmentary sectional view on an enlarged scale taken generally along line 4—4 of FIG. 3 in the direction of the arrows.

Referring now more particularly to FIGS. 2-4, the present invention provides an alignment device 70 which serves as a jig to properly align the saw blade 38 in the lower blade clamp 42. The blade clamp 42 includes a pair of generally cylindrical clamp elements 72 and 74 between which the lower end of blade 38 may be clamped. The clamp elements 72 and 74 have flat clamping surfaces 72a and 74a, respectively, which confront one another when the clamping elements are clamped onto blade 38. The clamping elements also have flat sides 72b and 74b on the ends opposite the clamping surfaces. The flats 72b and 74b facilitate tightening of the blade clamp with a wrench or other tool. A threaded stud 75 is screwed into element 72 and projects beyond surface 72a so that clamp element 74 can be threaded onto the stud and tightened to clamp blade 38 between surfaces 72a and 74a. Stud 75 is threaded into central passages in elements 72 and 74 and is thus centered on the clamp elements.

The alignment device 70 takes the form of a flat bar 76 formed of a suitable metal. Bar 76 has a flat upper surface 78 into which a recess 80 extends. Recess 80 includes a transverse oval passage 82 which extends completely through bar 76. Recess 80 also includes a cylindrical center portion 84 which has substantially the same size and shape as the clamp elements 72 and 74. Portion 84 of the recess does not extend completely through bar 76 and terminates at a ledge 86 (FIG. 4) formed within recess 80 on each side of the oval passage 82.

A longitudinal groove 88 extends into surface 78 of the bar and intersects at one end with the center of recess 80. Because of the centered location at groove 88, it is in exact alignment with stud 75 when the lower blade clamp 42 is fitted in recess 80. Groove 88 is slightly wider than the saw blade 38 so that the saw blade fits closely in the groove. As best shown in FIG. 4, the bottom or base of groove 88 is at the same depth as clamp surface 72a when clamp element 72 is inserted into recess 80 and seated on the ledge 86.

In use, the alignment device 70 serves to hold the saw blade 38 properly aligned in the blade clamp 42. Clamp element 72 may be inserted into recess 80 until it seats on ledge 86 in the manner illustrated in FIG. 4. The portion of clamp element 72 between the flat sides 72b fits closely in the lower portion of the oval passage 82, thus preventing rotation of clamp element 72. Because of the centered position of groove 88 relative to recess 80, the saw blade 38 can be placed in groove 88 and butted against the threaded stud 75, and the saw blade is automatically centered on clamp element 72. The other clamp element 74 may then be threaded onto stud 75 and tightened securely against blade 38, thus clamping the blade between surfaces 72a and 74a with the blade being centered relative to the blade clamp 42 in exact alignment with the central stud 75.

Figure 5:
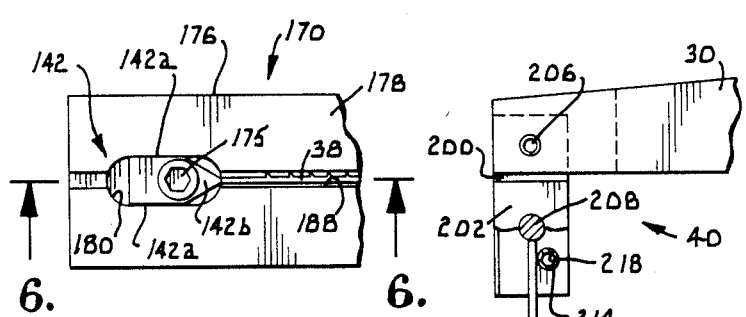
FIG. 5 is a fragmentary top plan view similar to FIG. 3 but showing another blade clamp and saw blade applied to an alignment device constructed according to a further embodiment of the invention.
Figure 6:
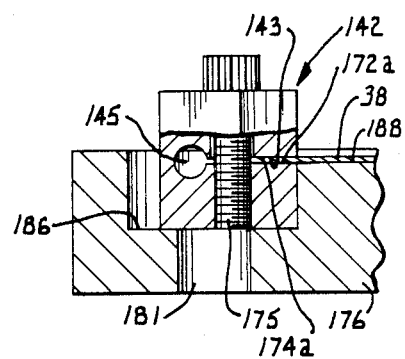
FIG. 6 is a fragmentary sectional view taken generally along line 6—6 of FIG. 5 in the direction of the arrows.

Referring now to FIGS. 5 and 6, a modified alignment device 170 is used to properly align blade 38 in an alternative blade clamp 142. Clamp 142 is a one piece metal block having flat opposite sides 142a and a tapered nose or point 142b which seats in the V-shaped groove 44 in the lower saw arm 32.

As best shown in FIG. 6, the blade holder 142 has a slit 143 which extends into the pointed nose 142b and is wide enough to receive the lower end of blade 38. At the back end of slit 143, a transverse passage 145 extends between the flat sides 142a of the blade clamp 142. Clamping surfaces 172a and 174a are formed on the blade clamp below and above slit 143. A screw 175 fits loosely through the upper portion of clamp 142 and is threaded into the lower portion of the blade clamp, thus tightening the clamp surfaces 172a and 174a against blade 38 when the screw is tightened. The clamp surfaces then securely clamp the lower end of the blade in the blade holder 142.

The alignment device 170 is generally similar to alignment device 70, except that device 170 has a recess 180 which is specially shaped to accommodate blade holder 142. Recess 180 is generally oval and includes flat opposite sides located adjacent to sides 142a when the clamp holder is inserted in the recess. As best shown in FIG. 6, the lower portion 181 of recess 180 is cylindrical, and a ledge 186 is formed at the bottom of the oval portion of recess at its intersection with the cylindrical portion 181. The clamp holder 142 seats on ledge 186 when inserted in the recess.

The upper surface of block 176 is provided with a longitudinal groove 188 which is wide enough to closely receive the saw blade 38. Groove 188 intersects with recess 180 and is aligned with the longitudinal center line of the recess. A saw blade 38 inserted in groove 188 is thus aligned with the pointed end 142b and with screw 175 when blade clamp 142 is inserted into recess 180. As best shown in FIG. 6, groove 188 has a depth such that its bottom or base is aligned with the lower clamping surface 172a, thus allowing blade 38 to fit between surfaces 172a and 174a when the blade is in the groove.

In use, the alignment device 170 functions in essentially the same manner as device 70. Blade clamp 142 is inserted into recess 180 and seats on ledge 186. Screw 175 is loosened, and the blade 38 is inserted into groove 188 and fitted at its lower end into the slot 143 until the end of the blade is butted against screw 175. The blade is then centered on the blade clamp and is properly aligned as screw 175 is tightened to clamp the lade in place. The engagement of sides 142a against the opposite sides of recess 180 prevents rotation or other undesirable movement of the blade clamp 142 during tightening of the screw.

Figure 7:
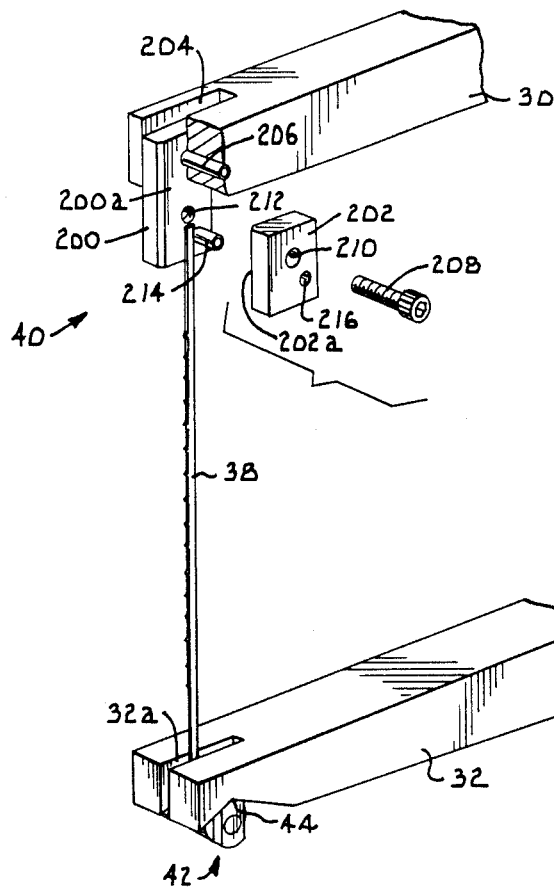
FIG. 7 is a fragmentary perspective view showing the end portions of the saw arms, the saw blade and an upper blade clamp constructed according to the present invention, with the parts of the blade clamp shown in exploded form and a portion of the upper arm broken away for purposes of illustration.
Figure 8:
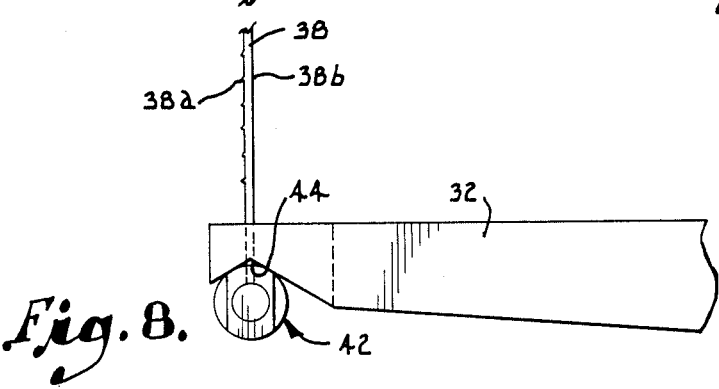
FIG. 8 is a fragmentary side elevational view of the front end portions of the saw arms with the blade and both blade holders in place thereon, the break lines indicating continuous length of the blade.

The upper blade holder 40 is best illustrated in FIGS. 7 and 8. It includes a pair of clamp elements which take the form of rectangular bars or blocks 200 and 202. The blocks 200 and 202 have flat clamping surfaces 200a and 202a, respectively, which clamp the top end of the saw blade 38 between them when the blade clamp is tightened.

Block 200 is somewhat longer than block 202 and has its top portion fitted in a slot 204 formed in the end of the upper arm 30. A horizontal pivot pin 206 extends through the arm 30 and through the upper portion of block 200 in order to mount the blade clamp 40 on the upper saw arm for pivotal movement about the axis of pin 206.

Blocks 200 and 202 may be clamped together by a screw 208 which extends through an unthreaded opening 210 in block 200 and is threaded into an internally threaded opening 212 formed through block 200. The aligned openings 210 and 212 are located directly below the axis of the pivot pin 206 at the transverse center of the blade clamp 40.

A roll pin 214 is fitted closely in aligned apertures 216 and 218 (see FIG. 8) which are formed in the respective clamp blocks 202 and 200 at a location below and slightly to the rear of the screw 208. The pin 214 is located to the rear of a straight line extending between pin 206 and screw 208. Pin 214 prevents blocks 200 and 202 from rotating relative to one another about the axis of screw 208, and the pin 214 additionally serves as a guide for properly locating blade 38 in the blade clamp 40. As best shown in FIG. 8, pin 214 is strategically located such that when the top end of blade 38 is inserted between the clamp surfaces 200a and 202a with the blunt edge 38b of the blade held against pin 214, the blade 38 is exactly centered transversely in the blade clamp 40 and is accurately aligned with screw 208 and pivot pin 206. The toothed cutting edge 38a of blade 38 is opposite the blunt edge 38b and faces forwardly when the blade is installed.

When the scroll saw 10 is in operation, the saw arms 30 and 32 are reciprocated up and down about the pivot bolts 34 and 36 in order to drive the blade 38 up and down for sawing of workpieces positioned on the table 16. The upper and lower ends of the blade are securely clamped in place by the upper blade clamp 40 and the lower blade 42. The upper blade clamp 40 is able to pivot about the pivot pin 206, while the lower blade clamp 42 (or 142) is able to rock in groove 44 as required to accommodate sawing action of the blade. The blade 38 can move in a slot 32 (FIG. 7) formed in the front end of arm 32. The blade tension is maintained constant by tightening the cam 52 in the position shown in FIG. 1.

When a piercing or interior cut is to be made, the blade 38 must be removed from the saw arms and fed through the opening in the workpiece where the interior cut is to be made. This is accomplished by loosing cam 52 to relieve that blade tension and then loosening screw 208 in order to relieve the clamping force applied by the clamp blocks 200 and 202. With the top end of blade 38 thus released, the blade and the lower blade clamp 42 can be lowered and then threaded upwardly through slot 32a and the opening in the workpiece. The top end of the blade is then fitted between blocks 200 and 202 and is butted at its end against the screw 208. Pin 214 provides a guide against which the blunt edge of blade 38 can be held to assure that the blade is properly centered in blade clamp 40 as screw 208 is tightened again to clamp the blade in place. After the blade has been reclamped in the upper blade clamp 40, cam 52 is tightened again by rotating it to the position shown in FIG. 1.

The strategic location of the roll pin 214 permits it to serve as a blade guide which assures that the blade will be properly and repeatably centered in the upper blade clamp 40 each time it is removed and reclamped. This arrangement in combination with the quick release tensioning mechanism permits the blade to be quickly and easily removed and reclamped before and after the performance of each interior cutting operation. In addition, the blade can be quickly and easily positioned properly in the blade clamp each time it is removed and reclamped. At the same time, the blade tension is maintained uniform and constant because the blade is always positioned with its ends against screws 75 and 208.

Replacement of a broken or otherwise damaged blade is likewise carried out quickly and easily by virtue of the present invention. The broken blade is released from the upper blade holder 40 by loosening screw 208, and it is released from the lower blade holder 42 by loosening clamp element 74. The lower blade clamp 42 is then placed in recess 80 of the alignment tool 70, and the new blade is placed in groove 88 with its end butted against the stud 75. Clamp element 74 is then tightened on the stud to securely clamp the lower end of blade 38 between the clamp surfaces 72a and 74a. In this manner, the alignment device 70 assures that blade 38 will be properly aligned and centered in the lower blade clamp 42.

It should be noted that if the alternative blade clamp 142 is used, tool 170 may be used to assure proper alignment and centering of the blade in clamp 142. It should also be noted that blade clamps having different configurations can be used and that an alignment tool having a recess of the proper configuration for each different blade clamp can be provided to assure blade alignment.

After the new blade has been clamped in the lower blade clamp 42, it is extended through slot 32a and its top end is inserted between blocks 200 and 202 and butted against screw 208 with the blunt edge 38b engaged against the guide pin 214 in the manner previously indicated. When screw 208 is then tightened, the blade is properly installed and cam 52 can be tightened to maintain the blade under proper tension. It is thus evident that the alignment devices 70 and 170 of the present invention and the uniquely arranged upper bladed clamp 40 facilitate and expedite blade changes. At the same time, the saw blade is always positioned properly and aligned both in the upper and lower blade clamps and is always maintained under the proper tension for effective sawing action.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A blade clamp for holding one end of a saw blade in a scroll saw having a pair of reciprocating arms, said blade clamp comprising:
   a pair of separable clamp elements having a pair of aligned apertures;
   means for pivotably coupling one of the clamp elements to one of the arms of the saw for movement about a pivot axis offset from said apertures;
   a fastener extending between said clamp elements at a location offset from said apertures and from said pivot axis, said fastener having a tightened condition for clamping the end of the saw blade between said clamp elements and a loose condition for releasing the blade from the clamp elements; and
   a pin fitting closely in the aligned apertures to prevent said clamp elements from pivoting relative to one another about said fastener, said pin being disposed at a location to provide a guide against which the saw blade can be held during tightening of said fastener, said pin being disposed to maintain the blade in a preselected aligned location when the blade is held against said pin with the end of the blade butted against fastener between the clamp elements.

2. In a scroll saw of the type having upper and lower arms and a scroll saw blade with a cutting edge and a blunt edge extending between the arms, a blade clamp comprising:
   a pair of clamp elements one of which is pivotably coupled with the upper arm;
   a screw extending between said clamp elements for clamping the upper end of the blade therebetween when the screw is tightened;
   a pair of aligned apertures in said clamp elements; and
   a pin received in said apertures at a location offset below said screw to prevent relative rotation of said clamp elements about said screw, said pin being located to maintain the blade at a preselected aligned position when the upper end of the blade is inserted between the clamp elements and butted against said screw with the blunt edge of the blade held against said pin during tightening of the screw.

* * * * *